United States Patent
Levy et al.

(10) Patent No.: US 11,928,144 B2
(45) Date of Patent: Mar. 12, 2024

(54) CLUSTERING OF LOG MESSAGES

(71) Applicant: LogsHero Ltd., Tel-Aviv (IL)

(72) Inventors: Tomer Levy, Tel-Aviv (IL); Asaf Yigal, Tel-Aviv (IL); Ziv Segal, RaAnana (IL); Amir Kalron, Tel Aviv (IL); Eran Nir, Tel Aviv (IL); Asaf Mesika, Rishon-LeZion (IL); Doron Gill, Givataim (IL)

(73) Assignee: LogsHero Ltd., Tel-Aviv (IL)

( * ) Notice: Subject to any disclaimer, the term of this patent is extended or adjusted under 35 U.S.C. 154(b) by 9 days.

(21) Appl. No.: 17/544,979

(22) Filed: Dec. 8, 2021

(65) Prior Publication Data

US 2022/0092102 A1 Mar. 24, 2022

Related U.S. Application Data (63) Continuation of application No. 15/997,742, filed on Jun. 5, 2018, now Pat. No. 11,216,502.

(51) Int. Cl.
*G06F 16/35* (2019.01)
*G06F 16/903* (2019.01)
*G06F 17/17* (2006.01)
*G06F 18/22* (2023.01)

(52) U.S. Cl.
CPC ...... *G06F 16/355* (2019.01); *G06F 16/90344* (2019.01); *G06F 17/17* (2013.01); *G06F 18/22* (2023.01)

(58) Field of Classification Search
None
See application file for complete search history.

(56) References Cited

U.S. PATENT DOCUMENTS

| 9,898,509 | B2 * | 2/2018 | Saperstein | .......... H04L 63/1425 |
| 2018/0102938 | A1 * | 4/2018 | Yoon | ..................... G06F 16/358 |
| 2019/0034517 | A1 * | 1/2019 | Byrd | ....................... G06F 17/40 |
| 2019/0272482 | A1 | 9/2019 | Patil et al. | |
| 2019/0370347 | A1 | 12/2019 | Levy et al. | |

OTHER PUBLICATIONS

Advisory Action dated Jul. 19, 2021 From the US Patent and Trademark Office Re. U.S. Appl. No. 15/997,742. (3 Pages).
Notice of Allowance dated Sep. 7, 2021 From the US Patent and Trademark Office Re. U.S. Appl. No. 15/997,742. (7 Pages).
Official Action dated Dec. 24, 2020 from the US Patent and Trademark Office Re. U.S. Appl. No. 15/997,742. (10 pages).
Puvogel et al. "ITC and JPECT Training System Development Driving Command and Control Systems Development", SCSC '08: Proceedings of the 2008 Summer Computer Simulation Conference, 26: Jun. 1-6, 2008.

* cited by examiner

*Primary Examiner* — Tuankhanh D Phan (57) ABSTRACT

A computer implemented method of creating a clustering model used for clustering a plurality of log messages comprising using one or more processors for receiving a plurality of training log messages, performing the following for each of the plurality of training log messages: calculating a string distance between a textual content of the respective training log message and a representative string pattern of each of the plurality of clusters, associating the respective training log message with a respective one of the plurality of clusters in case the string distance is within a predefined threshold and adding a new cluster to the plurality of clusters for associating respective training log message in case the string distance exceeds the predefined threshold, and outputting the clustering model.

19 Claims, 3 Drawing Sheets

CLUSTERING OF LOG MESSAGES

RELATED APPLICATIONS

This application is a continuation of U.S. patent application Ser. No. 15/997,742 filed on Jun. 5, 2018. The contents of the above applications are all incorporated by reference as if fully set forth herein in their entirety.

BACKGROUND

The present invention, in some embodiments thereof, relates to clustering of log messages, and, more specifically, but not exclusively, to clustering of log messages according to textual similarity of the log messages and string patterns of a plurality of clusters of a clustering model.

Computing platforms, systems, services and/or applications are constantly evolving in functionality as well as in scope and deployment. In order to maintain, improve and/or analyze such platforms, systems, services and/or applications involving huge data volumes, analysis tools capable of handling such large data volumes were developed.

A major paradigm for such big data analysis is data logging and log analysis which may serve for multiple objectives such as, for example, compliance with security policies, compliance with audit and/or regulation, system and/or application troubleshooting, forensics (e.g. during investigations, in response to subpoena, etc.), security incident response, understanding user behavior and/or the like.

The log messages or log files comprising streams of messages in time-sequence may be received from a plurality of sources such as, for example, computing devices, network devices, operating systems, services, applications and practically by any intelligent or programmable device.

The received log messages may be stored and analyzed in order to generate analytics data which may significantly improve exploring operational flows, characteristics, user behavior and/or the like of the platforms, systems, services and/or applications for which the data is collected.

SUMMARY

According to a first aspect of the present invention there is provided a computer implemented method of creating a clustering model used for clustering a plurality of log messages, comprising using one or more processors for creating a clustering model adapted for clustering a plurality of non-training log messages in a plurality of clusters by:
Receiving a plurality of training log messages.
performing the following for each of the plurality of training log messages:
Calculating a string distance between a textual content of the respective training log message and a representative string pattern of each of the plurality of clusters.
Associating the respective training log message with a respective one of the plurality of clusters in case the string distance is within a predefined threshold.
Adding a new cluster to the plurality of clusters for associating respective training log message in case the string distance exceeds the predefined threshold.
Outputting the clustering model.
According to a second aspect of the present invention there is provided a system for creating a clustering model used for clustering a plurality of log messages, comprising:
A program store storing a code.
One or more processors coupled to the program store for executing the stored code to create a clustering model adapted for clustering a plurality of non-training log messages in a plurality of clusters, the code comprising:
Code instructions to receive a plurality of training log messages.
Code instructions to perform the following for each of the plurality of training log messages:
Calculate a string distance between a textual content of the respective training log message and a representative string pattern of each of the plurality of clusters.
Associate the respective training log message with a respective one of the plurality of clusters when the string distance is within a predefined threshold.
Add a new cluster to the plurality of clusters for associating respective training log message when the string distance exceeds the predefined threshold.
Code instructions to output the clustering model.

Creating the clustering model may allow for clustering the log messages and associating them with respective clusters and respective identifier tags thus significantly improving management visibility, analysis transfer and/or storage of the log messages.

In a further implementation form of the first and/or second aspects, the clustering model is used for reducing a size of each of at least some of the plurality of non-training log messages by:
Calculating the string distance between the textual content of each of one or more subsets of the plurality of non-training log messages and the representative string pattern of each of the plurality of clusters.
Associating the one or more subsets of non-training log messages with a respective one of the plurality of clusters presenting a shortest string distance among the plurality of clusters.
Expressing each of the non-training log messages of the one or more subsets using the representative string pattern of the respective cluster.
Consolidating the subset of non-training log messages expressed by the representative string pattern of the respective cluster.

Consolidating subsets of log messages may significantly reduce the volume of the log messages as multiple log messages associated with a certain cluster(s) may be grouped together with the respective representative patter(s) addressed only once and including only the delta of each log message, i.e. the variables, with respect to the respective representative pattern. Reduction of the log messages volume may significantly reduce utilization of resources, for example, computing resources, storage resources, network resources and/or the like required for processing, storing and/or transferring the log messages.

In a further implementation form of the first and/or second aspects, the clustering model is used for reducing a volume of the plurality of non-training log messages by discarding one or more of the plurality of non-training log messages associated with one or more of the plurality of clusters defined as an excluding cluster. Discarding at least some of the log messages to further reduce the log messages volume may further reduce the resources utilization for processing, storing and/or transferring the log messages.

In a further implementation form of the first and/or second aspects, the clustering model is used for detecting one or more anomalies within the plurality of non-training log messages by:

Calculating the string distance between the textual content of each of the plurality of non-training log messages and the representative string pattern of each of the plurality of clusters.

Detecting one or more non-clustered log messages of the plurality of non-training log messages for which the string distance to the representative string pattern of each of the plurality of clusters exceeds the predefined threshold.

Generating an alert indicative of the one or more non-clustered log messages.

Clustering the log message may allow for simple anomaly detection since log messages which cannot be associated with any of the clusters in the clustering model may be highly indicative of one or more anomalies and optionally anomaly type, nature, characteristics and/or the like.

In a further implementation form of the first and/or second aspects, the clustering model is used for detecting one or more sequence patterns of log messages in the plurality of non-training log messages by:

Identifying respective clusters selected for each of one or more subsets of the plurality of non-training log messages received in sequence.

Detecting the one or more sequence patterns according to the selection of the respective clusters.

Detecting and mapping patterns of the sequences of log messages may significantly improve the ability to identify failed and/or broken process(es) by comparing the sequences patterns to normal process(es).

In a further implementation form of the first and/or second aspects, the string distance is expressed by one or more string metrics. Using the string metrics allows for an absolute, definite, predictable and/or reliable measurement metrics for clustering the log messages to their respective clusters.

In a further implementation form of the first and/or second aspects, one of the string metrics is Levenshtein distance. Using industry standard metrics such as the Levenshtein distance may significantly reduce development effort, cost and/or complexity as well as significantly reduced deployment effort.

In an optional implementation form of the first and/or second aspects, one or more of the plurality of training log message are preprocessed to replace one or more known tokens identified in the one or more training log messages with a predefined token. Replacing at least some of the tokens in at least some of the log messages may significantly reduce the processing resources and/or complexity for processing the log messages since the predefined tokens may be easily identified and processed accordingly.

In an optional implementation form of the first and/or second aspects, the plurality of training log messages are partitioned to a plurality of groups based on one or more attributes shared by training log messages of each of the plurality of groups, the one or more attributes are members of a group consisting of: a metadata value, a length and a number of variable fields. Partitioning the log messages may allow adapting the clustering model according to the platform and/or application the clustering according to the log messages' attributes. This may significantly improve accuracy of the clustering model which may significantly improve accuracy, efficiency and/or rapidness in processing the log messages.

In a further implementation form of the first and/or second aspects, the representative string pattern of one or more of the plurality of clusters is created by extracting a common string pattern shared by all training log messages associated with the one or more clusters, the common string pattern comprising one or more constant tokens and one or more variable fields adapted to receive a plurality of values included in the log messages of a respective cluster. The representative string pattern is a fundamental element in clustering the log messages. Therefore in order to accurately and efficiently represent the log message(s) associated with each cluster the respective representative string pattern may be constructed to include constant tokens and variable fields common to the associated messages where the variable fields may accept different values in different log messages.

In a further implementation form of the first and/or second aspects, the representative string pattern of one or more of the plurality of clusters is expressed by a respective representative training log message previously associated with the respective cluster. Using a previously associated (clustered) log message as the representative string pattern may be significantly simple as the log message is readily available requiring insignificant and potentially no computing resources.

In an optional implementation form of the first and/or second aspects, one or more of the plurality of clusters of the clustering model are split to create multiple new clusters in case entropy calculated for the textual content of at least some training log messages associated with the respective cluster is within a predefined splitting threshold. Splitting cluster(s) may allow adapting the clustering model to accurately follow the structure and content of the log messages. This may significantly improve accuracy of the clustering model which may significantly improve accuracy, efficiency and/or rapidness in processing the log messages.

In an optional implementation form of the first and/or second aspects, two or more of the plurality of clusters of the clustering model are merged to create a new unified cluster in case the string distance between the representative string pattern of the at least two clusters is within a predefined merging threshold. Merging clusters may allow adapting the clustering model to accurately follow the structure and content of the log messages. This may significantly improve accuracy of the clustering model which may significantly improve accuracy, efficiency and/or rapidness in processing the log messages.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to clustering of log messages, and, more specifically, but not exclusively, to clustering of log messages according to textual similarity of the log messages and string patterns of a plurality of clusters of a clustering model.

According to some embodiments of the present invention, there are provided methods and systems for clustering a plurality of log messages received from one or more originating sources and relating to one or more computing platforms, infrastructures, services, applications, processes and/or the like. The clustering of the log messages is done in two phases, first during a training phase a clustering model is created using a plurality of training log messages and during a run-time phase the clustering model may be used to cluster a plurality of actual (non-training) log messages.

The log messages, either the training log messages and/or the non-training log messages, may typically relate to the textual content of the received log messages. However, one or more of the log messages may further include one or more additional elements, for example, a metadata and/or the like while other elements of the log message may be removed, for example, an extracted field, an extracted symbol and/or the like. The textual content of each log message may therefore include a text structure comprising one or more tokens (lexical tokens) which may include a token name and/or a token value, for example, an identifier assigned in a computer (software) program, a keyword used by the computer program, a separator (punctuator), an operator, a symbol, a literal (a numeric, a logical, a textual, a symbolic and/or a reference literal), a comment (e.g. line, block, etc.) and/or the like.

Naturally, the training log messages used during the training phase are selected, constructed and/or adapted according to the computing platform(s), infrastructure(s), service(s) and/or application(s) it is designed to serve.

Optionally, prior to the clustering process, either during the training phase and/or during the run-time phase, one or more of the log messages are preprocessed to identify and replace one or more known (regular) expressions, patterns, symbols and/or the like with respective predefined expressions, symbols, identifiers and/or the like.

Optionally, prior to the clustering process, either during the training phase and/or during the run-time phase, the log messages are partitioned (divided) to one or more subsets based on one or more attributes common to the respective subset of log messages, for example, a metadata value (if available) describing, for example, a type of the log message, a log level and/or the like, a length of the training log message, a number of variables identified within the training log message and/or the like.

During the training phase, the clustering model, for example, a tree (decision tree), a list and/or the like is created by clustering together training log messages according to a similarity of the textual content of the training log messages. The training phase is an iterative process in which each training log message is compared for similarity to previously processed training log messages. The similarity may be evaluated using, for example, a string metric such as, for example, Levenshtein distance and/or the like to calculate a string distance between the textual content of each processed training log message and a representative string pattern of each of the clusters.

In case the calculated string distance between the textual content of a respective training log message and the represented string pattern of one of the clusters is within (does not exceed) a predefined (distance) threshold, the respective training log message is associated (clustered) with the respective cluster. In case the calculated string distance between the textual content of a respective training log message and the represented string pattern of any of the clusters exceeds the predefined threshold, a new cluster is created in (added to) the clustering model for the respective training log message.

Since clustering the log messages essentially relies on calculating the string distance between the processed log message and the representative string pattern of each of the clusters, the clustering model may be regarded as structure (e.g. a tree) of representative string patterns. The representative string pattern extracted for each of the clusters may be selected and/or constructed using one or more implementations. In the most naïve implementation, the representative string pattern of a certain cluster may simply be one of the training log messages already clustered (associated) to the certain cluster. This may be the case specifically when the certain cluster contains only a single log message.

However, in order to more accurately express (represent) the plurality of log messages associated (clustered) with a certain cluster, the representative string pattern may be extracted to identify constant tokens and/or variable fields common to the plurality of log messages associated with the certain cluster. In particular, the associated log messages may be analyzed, for example, using one or more text comparison methods, techniques and/or algorithms for example, "gestalt pattern matching" (based on Ratcliff and Obershelp method), regex and/or the like adapted to find matching parts in two strings, or possibly in a list of any hash-able objects.

Using these text comparison algorithms, matching constant part(s) may be identified in all training log messages associated with a respective cluster and defined as constant tokens in the representative string pattern of the respective cluster. Moreover, using these text comparison algorithms one or more variable fields may be identified in all training log messages associated with a respective cluster and defined as variable fields in the representative string pattern of the respective cluster which may have different values in different log files associated with the same respective cluster.

Furthermore, for one or more of the clusters, one or more constant tokens may be identified which may slightly vary among a multitude of training log messages associated with the respective cluster. In such case the slightly varying tokens may be replaced with respective variable fields in the representative string pattern thus the textual content of the multitude of log messages conforms to the representative string pattern.

Optionally, during the training and/or during run-time evolution of the clustering model, the representative string pattern of one or more of the clusters may be adjusted to replace one or more slightly varying constant tokens in the representative string pattern with variable fields and vice versa, to replace variable fields with constant tokens.

Optionally, during the training phase, one or more of the clusters may be split to smaller clusters and/or merged to form larger unified cluster(s). Splitting and/or merging clusters may be done as part of periodic and/or initiated analysis of the clustering model for correction, rebalance and/or update of the clustering model, for example, after processing one or more additional training log messages.

The analysis of the clustering model may include calculating entropy over the variable fields identified in the log messages clustered in a certain cluster. High entropy, exceeding a predefined splitting threshold, detected for a certain variable field of a plurality of log messages associated (clustered) with certain cluster may indicate that the variable field is indeed a variable since the certain variable field receives many different values (patterns) for different log messages. However, low entropy, within (does not exceed) the predefined splitting threshold, detected for a certain variable field may indicate that the variable field may actually be a constant token receiving a limited number of values in the log messages associated with the certain cluster. In case of the entropy is within the predefined splitting threshold the cluster may be split to a plurality of smaller clusters such that the low entropy variable in the original (parent) cluster is replaced with constant tokens in the split (child) clusters.

The analysis of the clustering model may further include calculating a string distance between the representative string patterns of a plurality of clusters. In case the calculated string distance is within (does not exceed) a predefined merging threshold, the respective clusters may be merged to create a unified cluster. Optionally, one or more constant tokens of the merged clusters are replaced with respective variable fields in the unified cluster.

During the run-time phase, a plurality of (non-training) log messages may be received and clustered according to the clustering model. Clustering (associating) the log messages to the clusters may be done based on the string distance between the textual content of each log message and the representative string patterns of the clusters as described for the training phase.

The log messages clustered during the run-time phase typically marked to indicate the cluster they are associated with may then be outputted. Optionally one or more additional run-time products may be outputted.

Optionally, specifically in case one or more of the log message received during the run-time phase cannot be associated (clustered) with any of the clusters of the clustering model, the unassociated log message may be used for further training the clustering model to adapt accordingly, for example, create new cluster(s) for the unassociated log message(s).

Clustering the log messages may present significant advantages and benefits.

First, by clustering the log messages and marking them with a respective identifier tag indicative of their associated cluster visibility of the log messages may be significantly improved. As typically the amount of log messages may be huge it may be very difficult to present the log messages themselves or a distribution of the log messages. By arranging the log messages according to their assigned identifier tags the visualization of the log messages may be significantly improved. Moreover by arranging the log messages to present only their common representative string patterns (of their associated clusters) and a count of the log messages clustered to each of the clusters, the visualization of the log messages may be further improved allowing efficient presentation of the log files to one or more users, for example, an analyst using the log messages to analyze the process, service and/or application relating to the log messages.

Moreover, clustering the log message may allow for significant reduction of the volume of the log messages. The size of at least some of the log messages may be reduced by consolidating together one or more subsets of log messages. Each subset may include a plurality of log messages clustered to the same cluster. Therefore, each subset may include the respective representative string pattern associated with the respective cluster only once and an index to each of the log messages of the subset with only the variables (delta from the respective representative string) of the respective log message. This may significantly reduce the data volume of the log messages transmitted and/or stored thus significantly reducing network resources (e.g. bandwidth, time, etc.) and/or storage resources.

The data volume of the log messages may be further reduced by discarding, excluding and/or filtering one or more of the subsets of log messages associated with respective cluster(s) defined for exclusion. One or more exclusion rules may be applied for filtering log message clustered to one or more excluding clusters, for example, clusters associated with log messages of no interest, periodic status log message and/or the like. This may significantly reduce the data volume of the log messages transmitted and/or stored thus significantly reducing network resources (e.g. bandwidth, time, etc.) and/or storage resources. Moreover, discarding log messages clustered (associated) to the excluding clusters may significantly reduce the resources, for example, computing resources and/or storage resources and/or the like required for analyzing the log messages.

Furthermore, clustering the log message may significantly improve anomaly detection since inability to associate one or more of the log messages with respective cluster(s) may be highly indicative of one or more anomalies in the computing platforms, infrastructures, services, applications and/or processes to which the log messages relate. Moreover, based on further analysis, for example, a statistical analysis, statistics may be produced for the pattern(s) and/or value(s) of the un-clustered (unassociated) log message(s) to detect the anomaly type, its nature, characteristics and/or the like.

In addition clustering the log message to their respective clusters may significantly improve pattern detection of sequence of received log messages. Since each log message is associated with a respective cluster and is mapped to the respective representative string pattern, the sequence pattern(s) of the log messages may be clearly distinguished to identify failed and/or broken processes of the respective computing platforms, infrastructures, services, applications and/or processes.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
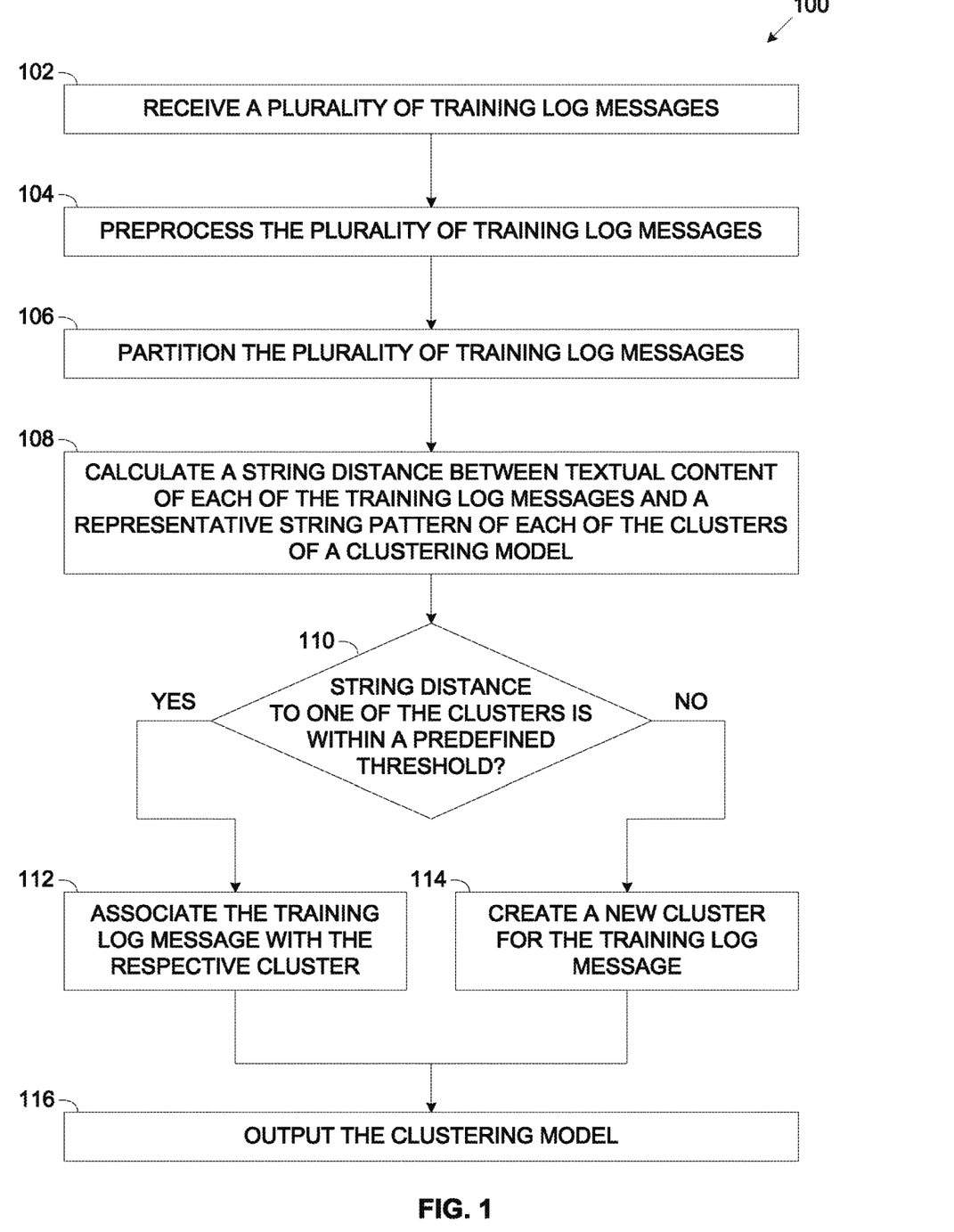
FIG. 1 is a flowchart of an exemplary training process of creating a clustering model, according to some embodiments of the present invention.

Referring now to the drawings, FIG. 1 illustrates a flowchart of an exemplary training process of creating a clustering model, according to some embodiments of the present invention. An exemplary process 100 may be executed during a training phase for creating a clustering model comprising to a plurality of clusters by clustering a plurality of training log messages relating to one or more computing platforms, infrastructures, services, applications, processes and/or the like.

The clusters of the clustering model are created (added) by iteratively processing each of the plurality of training log messages to calculate a string distance between the textual content of the respective training log message and a representative string pattern extracted for each the cluster(s) already created for one or more previously processed training log messages. The representative string pattern associated with each of the clusters may be a pattern common to the plurality of log messages clustered to a respective cluster, a selected representative log message clustered in a respective cluster and/or a combination of a plurality of selected representative log messages clustered in a respective cluster.

In case the string distance between the textual content of the respective training log message and the pattern of one of the clusters is within (does not exceed) a predefined threshold, the respective training log message is associated (clustered) to the respective cluster. In case the string distance between the textual content of the respective training log message and the pattern of any of the clusters exceeds the predefined threshold, a new cluster is created in the clustering model.

Figure 2:
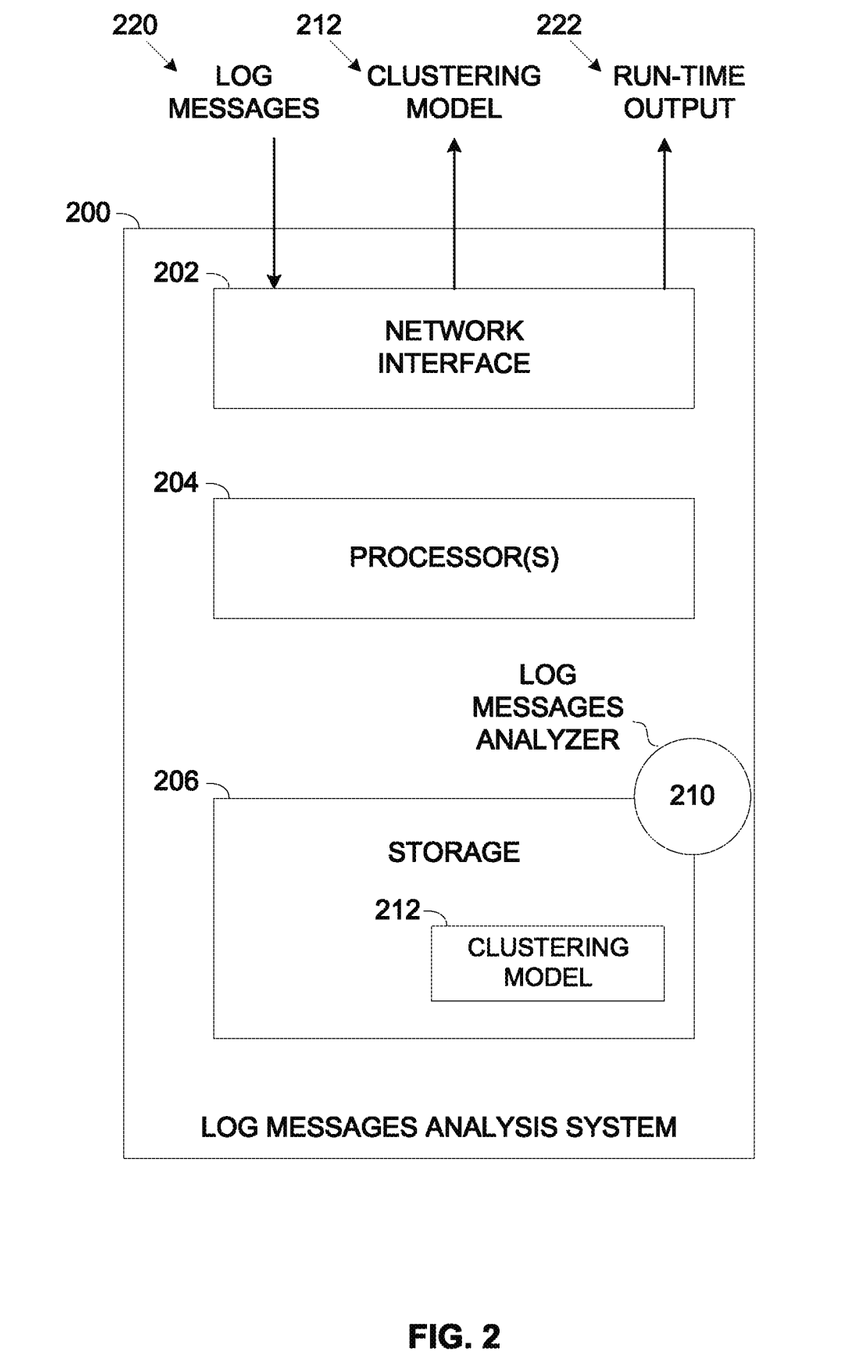
FIG. 2 is a schematic illustration of an exemplary system for creating a clustering model used for clustering log messages, according to some embodiments of the present invention.

Reference is also made to FIG. 2, which is a schematic illustration of an exemplary system for creating a clustering model used for clustering log messages, according to some embodiments of the present invention. An exemplary log messages analysis system 200, for example, a computer, a server, a computing node, a cluster of computing nodes and/or the like may include a network interface 202, a processor(s) 204 for executing a process such as the process 100 and a storage 206 for storing code and/or data.

The network interface 202 may include one or more interfaces for connecting to one or more wired and/or wireless networks, for example, a Local Area Network (LAN), a Wide Area Network (WAN), a Municipal Area Network (MAN), a cellular network, the internet and/or the like. Through the network interface 202, the log messages analysis system 200 may receive, fetch and/or retrieve a plurality of log messages 220, in particular log messages from one or more originating sources relating to a certain computing platform, infrastructure, service, application and/or the like.

The originating sources may include one or more computing devices, for example, a computer, a server, a computing node, a cluster of computing nodes, a cloud computing platform (e.g. Amazon Web Service (AWS), Google Cloud, Microsoft Azure, etc.), a mobile device, an Internet of Things (IoT) device, a wearable device and/or any computing device executing one or more software modules, for example, a an Operating System (OS), an application, an agent, a script, a tool, a service and/or the like. Additionally and/or alternatively, the log messages analysis system 200 may obtain the plurality of log messages 220 and/or part thereof from one or more remote storage resources, services and/or the like used to collect and store the training log messages 220.

Each of the log messages 220 typically refers to the textual part of the respective received log message. However, one or more of the training log messages 220 may include the entire log message entity including, for example, metadata, extracted field(s) and/or the like. Each of the log messages 220 may therefore include a text structure (textual content) comprising one or more tokens (lexical tokens) which may include a token name and/or a token value, for example, an identifier assigned in a computer (software) program, a keyword used by the computer program, a separator (punctuator), an operator, a symbol, a literal (a numeric, a logical, a textual, a symbolic and/or a reference literal), a comment (e.g. line, block, etc.) and/or the like.

The plurality of log messages 220 may include training log messages 220 used during the training phase to create a clustering model 212 and/or non-training log messages 220 received during the run-time phased and clustered according to the clustering model 212.

Using the network interface 202, the log messages analysis system 200 may output the clustering model 212, for example, a tree (decision tree), a list and/or the like created during the training phase using the plurality of training log messages 220. The log messages analysis system 200 may further output run-time output(s) 224, for example, analytics data, alert(s), reduced log messages and/or the like generated during the run-time phase based on clustering of the non-training log messages 220 according to the clustering model 212.

The processor(s) 204, homogenous or heterogeneous, may include one or more processing nodes arranged for parallel processing, as clusters and/or as one or more multi core processor(s).

The storage 206 may include one or more non-transitory memory devices, either persistent non-volatile devices, for example, a hard drive, a solid state drive (SSD), a magnetic disk, a Flash array and/or the like and/or volatile devices, for example, a Random Access Memory (RAM) device, a cache memory and/or the like. The storage 206 may further comprise one or more local and/or remote network storage resources, for example, a storage server, a network accessible storage (NAS), a network drive, and/or the like accessible via one or more networks through the network interface 202. The storage 206 may be further used to store the clustering model 212.

The processor(s) 204 may execute one or more software modules, for example, a process, a script, an application, an agent, a utility, a tool and/or the like each comprising a plurality of program instructions stored in a non-transitory medium such as the storage 206 and executed by one or more processors such as the processor(s) 204. For example, the processor(s) 204 may execute a log messages analyzer module 210 for analyzing the plurality of training log messages 220 during a training phase and clustering them to create a clustering model 212 comprising a plurality of clusters each grouping together one or more training log messages 220. The log messages analyzer module 210 may use the clustering model 212 to cluster non-training messages in a run-time phase.

Optionally, the log messages analysis system 200 and/or the log messages analyzer 210 are provided by one or more cloud computing services, for example, Infrastructure as a Service (IaaS), Platform as a Service (PaaS), Software as a Service (SaaS) and/or the like provided by one or more cloud infrastructures and/or services such as, for example, Amazon Web Service (AWS), Google Cloud, Microsoft Azure and/or the like.

As shown at 102, the process 100 executed during the training phase starts with the log messages analyzer 210 receiving a plurality of training datasets comprising a plurality of training log messages 220. The training log messages are selected, constructed and/or adapted to represent the log messages 220 received from the respective computing platform(s), infrastructure(s), service(s), application(s), process(s) and/or the like which are targeted for log message analysis during the run-time phase, i.e. according to the log messages that will be clustered (classified) using the clustering model 212.

The process 100 is an iterative process in which the log messages analyzer 210 process each of the plurality of training log messages 220 compared to previously processed training log messages 220. Initially the clustering model 212 is empty, i.e. comprises no clusters.

Following is an exemplary sequence of training log messages 220 which will be used throughout the description to present embodiments of the present invention. The log messages analyzer 210 may receive the following training log messages 220:

Received response for GetObject id 36cf4b93-5671-4636-8f4f-f57a516afe13 with status code FAIL in 88956

Received response for DeleteObject id 80f2db35-87a8-4f21-8dd2-e9a7e2628a1b with status code OK in 83911 get receiver inactive for 53 minutes

Received response for DeleteObject id 9a0e8b83-9159-4456-94ab-5a1bf513dd08 with status code OK in 69011 postEvent receiver inactive for 36 minutes

As shown at 104, the log messages analyzer 210 may preprocess the training log messages 220. The log messages analyzer 210 may analyze, for example, parse, scan, explore, inspect and/or the like each of the training log messages 220 to identify one or more known (regular) expressions, patterns, symbols and/or the like in the training log messages 220 and replace them with respective predefined expressions, symbols, identifiers and/or the like. For example, the log messages analyzer 210 may apply a regular expressions detector and/or the like to identify one or more of the known (regular) expressions, patterns, symbols and/or the like in the training log message 220, for example, Internet Protocol (IP) addresses, Unified Resource Locators (URLs), active user names, DATE, TIME, mail addresses, numbers (e.g. phone numbers, addresses, etc.) and/or the like. The log messages analyzer 210 may further remove from the training log messages 220 irrelevant and/or unnecessary marks, signs and/or the like from the training log messages 220, for example, a punctuation sign, a comment sign and/or the like.

After preprocessing the received exemplary training log messages 220, the log messages analyzer 210 may identify represent the exemplary training log messages 220 as follows:

Received response for GetObject id [UUID] with status code FAIL in [NUMBER]

Received response for DeleteObject id [UUID] with status code OK in [NUMBER]

get receiver inactive for [NUMBER] minutes

Received response for DeleteObject id [UUID] with status code OK in [NUMBER]

postEvent receiver inactive for [NUMBER] minutes

As presented by the example, for each of the training log messages 220, the log messages analyzer 210 identifies known (regular) expression, in particular known expression fields, for example, the objects identifier (id) which may vary between the training log messages 220 but relate to the same object id field, the process number which may vary between the training log messages 220 but relate to the same process number. The log messages analyzer 210 may then replace the known expressions identifies variables and replaces them with respective predefined expressions, for example, [UUID] and [NUMBER] respectively.

As shown at 106, the log messages analyzer 210 may partition, i.e. divide one or more subsets of the training log messages 220 into one or more respective groups based on one or more log message attributes common to the respective subset of training log messages 220, for example, a metadata value (if available) describing, for example, a type of the training log message 220, a log level and/or the like, a length of the training log message 220, a number of variables identified within the training log message 220 and/or the like.

For example, assuming the training log messages 220 include metadata indicating a log type which is typically system related. Further assuming the log messages analyzer 210 identifies that a first subset of the training log messages 220 is of a first log type and a second subset of the training log messages 220 is of a second log type. In such case the log messages analyzer 210 may partition the training log messages 220 to two groups each associated with one of the log types. The log messages analyzer 210 may further construct the clustering model 212 to include separate branches (segments) for clustering the different types of the training log messages 220. This means that the log messages analyzer 210 may propagate and cluster training log messages 220 of the first log type in a first branch of the clustering model 212 while propagating and clustering training log messages 220 of the second log type in a second branch of the clustering model 212. For example, the log messages analyzer 210 may construct the clustering model 212 to have a top "log type" level which branches to multiple "type" branches (segments), for example, two—type1 and type2 each comprising a plurality of clusters as follows:

{ type1:[cluster1, cluster2, . . . ],
type2:[cluster1, cluster2, . . . ]    }

In another example, assuming the training log messages 220 include metadata indicating a log level, for example, WARNING, DEBUG, INFO and/or the like. In such case the log messages analyzer 210 may partition the training log messages 220 to a plurality of groups according to their log level and may further construct the clustering model 212 to include separate branches (segments) for each of the log levels. For example, the log messages analyzer 210 may construct the clustering model 212 to have a top "log level" level which branches to multiple branches, for example, three—WARNING, DEBUG and INFO each comprising a plurality of clusters as follows:

{ WARNING:[cluster1, cluster2, . . . ],
DEBUG:[cluster1, cluster2, . . . ],
INFO:[cluster1 , cluster2, . . . ]    }

The log messages analyzer 210 may further apply multi-level partitioning in which the clustering model 212 may be adapted to cluster the training log messages 220 after partitioned according to a plurality of partitioning parameters and/or criteria. For example, assuming the training log messages 220 include metadata indicating both the log type and the log level. In such case the log messages analyzer 210 may construct the clustering model 212 to have two top levels followed by clusters as follows:

```
{ type1:  { WARNING:[cluster1, cluster2, . . . ],
            DEBUG:[cluster1, cluster2, . . . ],
            INFO:[cluster1, cluster2, . . . ]    },
  type2:  { WARNING:[cluster1, cluster2, . . . ],
            DEBUG:[cluster1, cluster2, . . . ],
            INFO:[cluster1, cluster2, . . . ]    }}
```

As shown at 108, the log messages analyzer 210 may evaluate a similarity of the textual content of each of the training log messages 220 to a representative string pattern of each of the clusters of the clustering model 212. The log messages analyzer 210 may apply one or more similarity analyses and/or similarity metrics, for example, Levenshtein distance and/or the like to calculate the string distance between the textual content of each of the training log messages 220 and the representative string pattern of each of the clusters of the clustering model 212. As such, the log messages analyzer 210 may apply the string metric may be used over the tokens identified in the training log message 220 to calculate the distance between the textual content of each training log message 220 and the representative string patterns associated with each of the clusters of the clustering model 212.

In case the processed training log messages 220 is the first training log message 220 that is processed, the log messages analyzer 210 has no previously processed training log messages 220 and may therefore simply creates (adds) a new cluster in the clustering model for associating (clustering) the first training log message 220 to the newly created (added) cluster.

As shown at 110, which is a decision point, in case the distance and/or similarity between the textual content of the training log message 220 and the representative string pattern of one of the clusters of the clustering model 212 is within a predefined threshold value, the process 100 branches to 112. Otherwise, in case the distance and/or similarity between the textual content of the training log message 220 and the representative string pattern of any of the clusters of the clustering model 212 exceeds the predefined threshold value, the process 100 branches to 114.

The predefined threshold value may express the level of similarity between the training log message 220 and the representative string pattern of the clusters. The string distance between the training log message 220 and the representative string patterns may be normalized, i.e. divided by a length of the training log message 220. The predefined threshold value may therefore be set to indicate, for example, a percentage of different tokens between the training log message 220 and the representative string patterns. Moreover, the predefined threshold value may be set according to a variance of the data in the log messages the clustering model 212 targets. In case the percentage of different tokens detected between the training log message 220 and the representative string patterns exceeds the predefined percentage, the training log message 220 may not be clustered to any of the existing clusters and the process may branch to 114. Optionally, the predefined threshold value is adjusted during the training process, for example, depending on the content and/or data of the training log messages 220.

As shown at 112, in case the distance and/or similarity between the textual content of the training log message 220 and the representative string pattern of one of the clusters of the clustering model 212 is within the predefined threshold value, the log messages analyzer 210 may associate (cluster) the training log message 220 with the respective cluster. Each of the training log messages 220 may be marked (tagged) accordingly to indicate the respective cluster it is associated with (clustered to).

As shown at 114, in case the distance and/or similarity between the textual content of the training log message 220 and the representative string pattern of one of the clusters of the clustering model 212 exceeds the predefined threshold, the log messages analyzer 210 may create and/or adds a new cluster to the clustering model 212 for clustering the respective training log message 220.

Continuing the previous example, the log messages analyzer 210 receiving the exemplary training log messages 220 may construct the clustering model 212 as follows. The example further relates to an initial training step of the clustering model 212 when there are no clusters defined by the clustering model 212 and hence the log messages analyzer 210 fails to find a matching pattern for the received exemplary training log messages 220.

Processing and calculating the string distance for the first training log message 220:
  Received response for GetObject id [UUID] with status code FAIL in [NUMBER]
Since there are no clusters defined by the clustering model 212, the log messages analyzer 210 creates a first cluster and associates (clusters) the first training log message 220 with the first cluster.

Processing and calculating the string distance for the second training log message 220:
  Received response for DeleteObject id [UUID] with status code OK in [NUMBER]
The log messages analyzer 210 determines that the string distance between the second training log message 220 and the representative string pattern of the first cluster (extracting the representative string pattern is described herein after, however at this stage may the representative string pattern may be the pattern of the first training log message 220) is within the predefined threshold. The log messages analyzer 210 may therefore associate (cluster) the second training log message 220 with the first cluster.

Processing and calculating the string distance for the third training log message 220:
  get receiver inactive for [NUMBER] minutes
The log messages analyzer 210 determines that the string distance between the third training log message 220 and the representative string pattern of the first cluster exceeds the predefined threshold. The log messages analyzer 210 may therefore create a second cluster and associate (cluster) the third training log message 220 with the second cluster.

Processing and calculating the string distance for the fourth training log message 220:
  Received response for DeleteObject id [UUID] with status code OK in [NUMBER]
The log messages analyzer 210 determines that the string distance between the fourth training log message 220 and the representative string pattern of the first cluster is within the predefined threshold. The log messages analyzer 210 may therefore associate (cluster) the fourth training log message 220 with the first cluster.

Processing and calculating the string distance for the fifth training log message 220:
  postEvent receiver inactive for [NUMBER] minutes
The log messages analyzer 210 determines that the string distance between the fifth training log message 220 and the representative string pattern of the second cluster (at this stage the representative string pattern may be the pattern of the third training log message 220) is within the predefined threshold. The log messages analyzer 210 may therefore associate (cluster) the fifth training log message 220 with the second cluster.

As evident the process 100 relies on extracting the representative string pattern for each of the clusters since each of the clusters of the clustering model 212 comprises one or more training log messages 220 the log messages analyzer 210 previously clustered during the training phase. During the training phase, the log messages analyzer 210 may therefore extract the representative string pattern for each of the clusters. The log messages analyzer 210 may use the extracted representative string patterns for calculating the string distance and cluster accordingly additional training log messages 220 accordingly during the training phase as well as non-training log messages 220 during the run-time phase. The representative string patterns comprises a common string pattern shared by all the training log messages 220 associated with the respective cluster and may include one or more constant tokens and/or one or more variable fields adapted to receive a plurality of values included in the log messages of associated with the respective cluster.

For one or more of the clusters, for example, cluster(s) comprising a single training log message 220, the log messages analyzer 210 may use the respective training log message 220 associated with the respective cluster as the representative string pattern of the respective cluster.

In case there are multiple training log messages 220 associated with a certain cluster, the log messages analyzer 210 may construct the representative string pattern of the respective cluster as an averaged distance of a plurality of training log messages 220 associated with the respective cluster.

Moreover, in case multiple training log messages 220 are associated (clustered) with one or more clusters, the log messages analyzer 210 may extract the representative string pattern by analyzing the multitude of training log messages 220 associated with the respective cluster and identifying a common pattern among the multitude of training log messages 220. The log messages analyzer 210 may extract the representative string pattern by analyzing the training log messages 220 associated with the respective cluster to identify constant tokens and variable fields which include variable values that may vary between the multitude of training log messages 220.

The log messages analyzer 210 may align the training log messages 220 of the cluster using one or more alignment algorithms and identify matching tokens (parts) in the training log messages 220 using one or more of the text comparison methods, techniques and/or algorithms, for example, "gestalt pattern matching" and/or the like adapted to find matching parts in two strings, or possibly in a list of any hash-able objects. Using these algorithms, the log messages analyzer 210 may identify matching constant parts among the plurality of training log messages 220 associated with the cluster and may define these constant parts as constant tokens in the representative string pattern. The log messages analyzer 210 may also identify common variable fields shared by the plurality of training log messages 220 associated with the cluster and define them as common variable fields in the representative string pattern.

For one or more of the clusters, the log messages analyzer 210 may further identify one or more constant tokens that may slightly vary among a multitude of training log messages 220 associated with the respective cluster. In such case the log messages analyzer 210 may replace one or more of the slightly varying tokens with respective variable fields in the representative string pattern thus conforming the textual content of the multitude of training log messages 220 to the representative string pattern.

To continue the previous example, the first cluster of the clustering model 212 may include the first, second and fourth exemplary training log messages 220 as follows:
Received response for GetObject id [UUID] with status code FAIL in [NUMBER]
Received response for DeleteObject id [UUID] with status code OK in [NUMBER]
Received response for DeleteObject id [UUID] with status code OK in [NUMBER]

The log messages analyzer 210 may identify that the constant tokens GetObject and DeleteObject slightly vary among the exemplary training log messages 220 and may therefore replace these slightly varying constant tokens with a variable field VAR1. The log messages analyzer 210 may further identify that the constant tokens FAIL and OK slightly vary among the exemplary training log messages 220 and may therefore replace these slightly varying constant tokens with a variable field VAR2. The representative string pattern of the first cluster may therefore be presented as follows:
Received response for [VAR1] id [UUID] with status code [VAR2] in [NUMBER]

Where the variable field VAR1 may have the values GetObject or DeleteObject and the variable field VAR2 may have the values OK or FAIL.

Optionally, during the training and/or during run-time evolution of the clustering model 212, for one or more of the clusters the log messages analyzer 210 may replace one or more slightly varying constant tokens in the representative string pattern with variable fields and vice versa replace variable fields with constant tokens. This specifically relates to splitting and merging clusters as defined herein after. For example, the log messages analyzer 210 may analyze the clustering model 212 upon creation of a new cluster to evaluate the need for splitting and/or merging clusters.

Optionally, the log messages analyzer 210 splits one or more of the clusters of the clustering model 212 to multiple smaller (child) clusters. The log files analyzer 210 may analyze entropy between the values of each of one or more variables identified for a plurality of training log messages 220 associated with a respective cluster. The higher the entropy for a certain variable field, the more different values this variable field gets in at least some of the associated training log messages 220 hence the probability that the variable is indeed a variable is high. In contrast, the lower the entropy for a certain variable identified for a plurality of training log messages 220 associated with a respective cluster, the less different values this variable gets in the associated training log messages 220. This may indicate that this variable may actually be a constant token which slightly differs in the associated training log messages 220. Therefore, in case the entropy detected for a certain variable field(s) in a certain cluster is within (i.e. does not exceed) a predefined splitting threshold, the log messages analyzer 210 may determine the variable(s) is actually a constant token(s). In such case the log files analyzer 210 may split the certain parent cluster to two or more child clusters in which the slightly varying variable field(s) may be defined as constant token(s) in the representative string pattern associated with each of the child clusters.

Continuing the previous example, the first cluster is associated with the representative string pattern:
Received response for [VAR1] id [UUID] with status code [VAR2] in [NUMBER]

Where VAR1 may have the values GetObject or DeleteObject and VAR2 may have the values OK or FAIL.

In such case and optionally depending on the number of training log messages classified in the first cluster, the log messages analyzer 210 may split the first cluster to two clusters as follows:
(1) Received response for GetObject id [UUID] with status code [VAR2] in [NUMBER]
(2) Received response for DeleteObject id [UUID] with status code [VAR2] in [NUMBER]

In the example, VAR1 in the first (parent) cluster is replaced with the two constant tokens GetObject in the first split cluster (1) and DeleteObject in the second split cluster (2). As such the first exemplary training log message 220 is classified to the first split cluster (1) and the second and fourth exemplary training log messages 220 are classified to the second split cluster (2).

Optionally, the log messages analyzer 210 merges one or more of the clusters of the clustering model 212 to a single cluster. Based on a distance and/or similarity calculation using the string metric, the log messages analyzer 210 may identify multiple clusters which are substantially similar. As described herein before, the similarity between the representative string patterns associated with the clusters may be determined according to a predefined threshold. In case the distance between representative string patterns of multiple clusters is within a predefined merging similarity threshold, i.e. the distance does not exceed the predefined merging threshold the log messages analyzer 210 may merge the multitude of clusters to a single unified cluster. The log messages analyzer 210 may further replace one or more constant tokens identified in the multitude of clusters with a variable in the merged cluster.

For example, assuming the clustering model 212 comprises two exemplary clusters associated with the following representative string patterns:
Deploying libbundle to [VAR3]
Deploying preLib to [VAR3]
Where VAR3 is a variable which may have the values test, dev or prod.

In such case and optionally depending on the number of training log messages 220 classified in the two exemplary clusters, the log messages analyzer 210 may merge the two exemplary clusters to a single unified cluster associated with the following pattern:
Deploying [VAR4] to [VAR3]
Where VAR4 is a variable which may have the values libbundle or preLib.

As shown at 116, the log messages analyzer 210 may output the clustering model 212. The clustering model 212, for example, a tree and/or the like represents the hierarchical clustering of the training log messages 220 and holds all the training log messages 220 clustered in the plurality of clusters each associated with a respective representative string pattern. Additionally and/or alternatively, the log messages analyzer 210 may store the clustering model 212 in the storage 206 for use during one or more run-time phases.

The clustering model 212 may be used for clustering newly received non-training log messages 220 into the clusters of the clustering model 212 based on the string distance calculated between the textual content of each non-training log message 220 and the representative string pattern of each of the clusters.

The clustering model 212 may further evolve and adjust during the run-time phase where the log messages analyzer 210 may use one or more of the non-training log messages 220 as described by the process 100 for updating and enhancing the clustering model 212.

Figure 3:
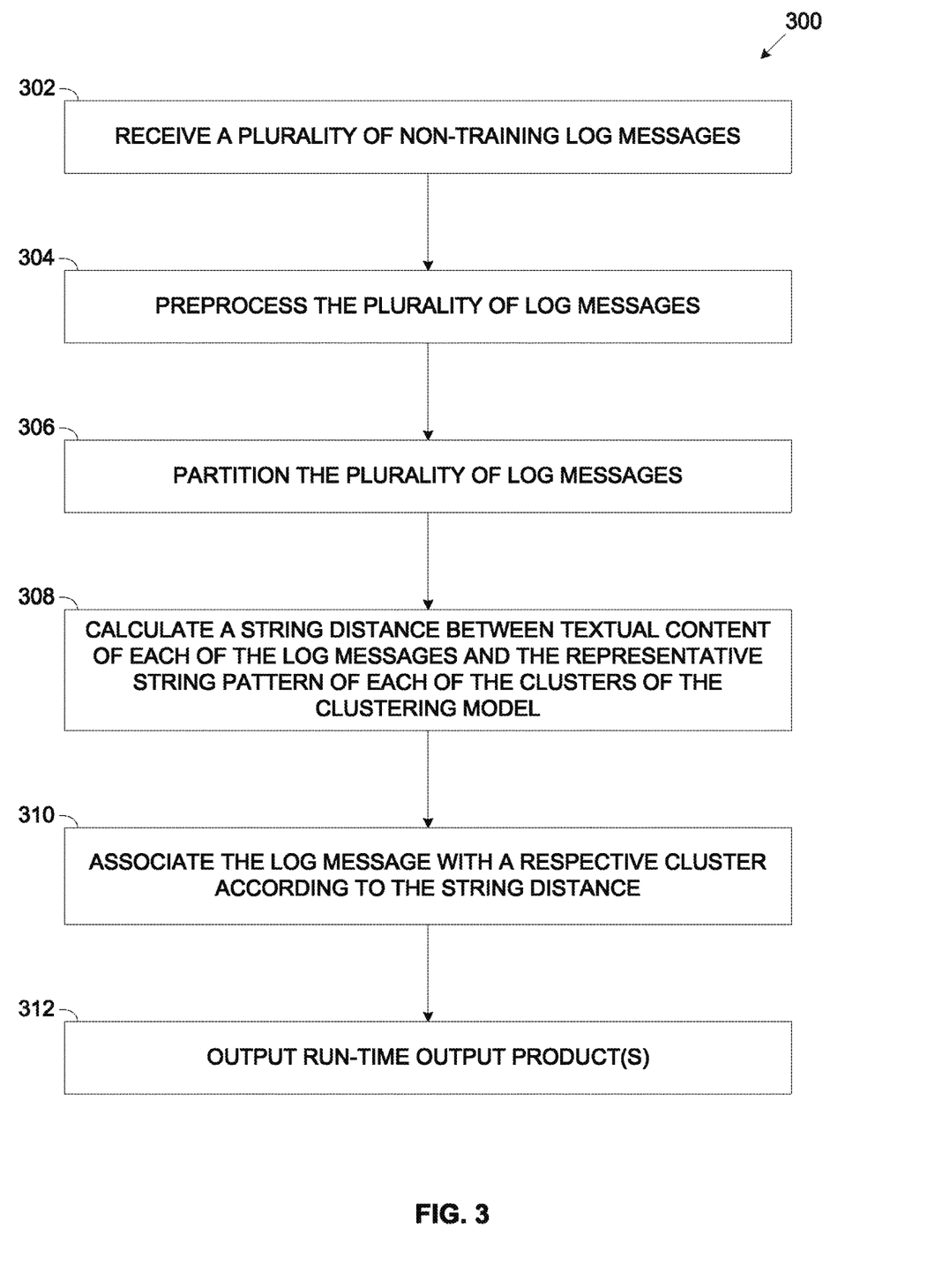
FIG. 3 is a flowchart of an exemplary run-time process of using a clustering model to cluster a plurality of non-training log messages, according to some embodiments of the present invention.

Reference is now made to FIG. 3, which is a flowchart of an exemplary run-time process of using a clustering model to cluster a plurality of non-training log messages, according to some embodiments of the present invention. An exemplary training process 300 may be executed by a log messages analyzer such as the log messages analyzer 210 to cluster non-training log messages 220 in run-time using a clustering model such as the clustering model 212. The run-time process 300 includes several steps which are similar to steps described for the training process 100.

As shown at 302, the process 300 executed during the run-time phase starts with the log messages analyzer 210 receiving a plurality of datasets comprising a plurality of (non-training) log messages 220 from one or more sources relating to a certain computing platforms, infrastructures, services, applications, process and/or the like. The log messages 220 may be received, for example, from a plurality of computing devices executing a certain service, application and/or the like. The log messages analyzer 210 may further receive the log messages 220 from a remote network resource storing the plurality of log messages 220 collected from the respective source(s).

As shown at 304, the log messages analyzer 210 may preprocess the log messages 220 as described for the training log messages 220 to identify one or more known (regular) expressions, patterns, symbols and/or the like in the training log messages 220 and replace them with respective predefined expressions, symbols, identifiers and/or the like.

As shown at 306, the log messages analyzer 210 may partition, i.e. divide one or more subsets of the log messages 220 as described for the training log messages 220 into one or more respective groups based on the log message attribute(s) common to the respective subset of training log messages 220, for example, the metadata value (if available), the length of the log message 220, the number of variables identified within the log message 220 and/or the like.

As shown at 308, which is a step similar to step 108 of the process 100, the log messages analyzer 210 evaluates the similarity of each log message 220 to the clusters of the clustering model 212. For example, the log messages analyzer 210 calculates the string distance, for example, the Levenshtein distance between the textual content of each log message 220 and the representative string pattern of each of the clusters of the clustering model 212. Each of the log messages 220 may be marked (tagged) accordingly to indicate the respective cluster it is associated with (clustered to).

As shown at 310, which is a step similar to step 112 of the process 100, the log messages analyzer 210 associates (clusters) each of the log messages 220 with a respective one of the clusters associated with a respective representative string pattern that is within the predefined threshold from the textual content of the respective log message 220.

In case, the log messages analyzer 210 is unable to associate (cluster) one or more of the log messages 220 to any of the clusters of the clustering model 212, the log messages analyzer 210 may use the unassociated log message(s) 220 as training log messages 220 and repeat the process 100 using the unassociated log message(s) 220 to adjust the clustering model 212 according to the unassociated log message(s) 220.

As shown at 312, the log messages analyzer 210 may output one or more run-time output products 222 based on the clustering of the received log messages 220.

For example, the run-time output 222 may include a cluster identifier assigned by the log messages analyzer 210 to one or more of the clustered log messages 220. The log messages analyzer 210 may transmit (output) the clustered log messages 220 with their assigned cluster identifiers which may allow for simple identification and/or visualization of the clustered log messages 220. Since the log messages 220 may include large volumes of (raw) log messages, aggregating the log messages 220 according to their clusters and identifying them with their cluster identifiers coupled with the count (amount) of log messages 220 associated with each cluster may significantly improve presentation and visibility of the log messages 220. Furthermore, identifying the log messages 220 according to their cluster identifier may significantly simplify data handling, organizing and analysis, for example, a statistical analysis applied to the log messages 220 in order to generate analytics data for the plurality of log messages 220.

In another example, the run-time output 222 may include a reduced data volume of the log messages 220. The log messages analyzer 210 may reduce the volume of the log messages 220 by consolidating one or more subsets of the clustered log messages 220 thus reducing their size. The log messages analyzer 210 may identify one or more subsets of log messages 220 associated with respective clusters. For each subset, the log messages analyzer 210 may consolidate the subset by transmitting (outputting) the representative string pattern associated with the respective cluster only once and indexing the each log message 220 of the subset to include only the variables (delta) of the respective log message 220 of the subset. This may significantly reduce the data volume of the log messages 220 transmitted and/or stored thus significantly reducing network resources (e.g. bandwidth, time, etc.) and/or storage resources.

In another example, the run-time output 222 may include a reduced number of the log messages 220. The log messages analyzer 210 may reduce the volume of the log messages 220 by discarding, excluding and/or filtering one or more of the clustered log messages 220 from the output (transmittal). The log messages analyzer 210 may apply one or more exclusion rules for filtering log message(s) 220 clustered to one or more excluding clusters, for example, clusters associated with log messages of no interest, periodic status log message and/or the like. For example, assuming a certain cluster(s) of the clustering model 212 is associated with a pattern reflecting standard periodic log messages received from one or more of the originating sources to indicate they are alive (up and running). Assuming one or more of the exclusion rules dictates discarding log messages 220 clustered (associated) to the certain cluster(s), the log messages analyzer 210 may not output the discarded log messages 220 which may constitute a significant part of the log messages 220. This may significantly reduce the data volume of the log messages 220 transmitted and/or stored thus significantly reducing network resources (e.g. bandwidth, time, etc.) and/or storage resources. Moreover, discarding log messages 220 clustered (associated) to the excluding clusters may significantly reduce the resources required for analyzing the log messages 220, for example, the statistical analysis may also exclude (filter) from the analysis one or more of the log messages 222 thus significantly reducing computing resources and/or storage resources required for the analysis.

In another example, the run-time output 222 may include an anomaly detection alert indicative of one or more detected anomalies within the plurality of the log messages 220. Clustering the log messages 220 to their respective clusters may significantly improve anomaly detection since inability of the log messages analyzer 210 to associate one or more of the log messages 220 with a respective cluster(s) may be highly indicative of one or more anomalies in the computing platforms, infrastructures, services, applications and/or processes to which the log messages 220 relate. Moreover, based on further statistical analysis, statistics may be produced for the pattern(s) and/or value(s) of the unclustered (unassociated) log messages 220 to detect the anomaly type, its nature, characteristics and/or the like.

In another example, the run-time output 222 may include one or more sequences of log messages 220 detected based on a pattern analysis in which sequence patterns of the clustered log messages 220 may be identified according to their representative string pattern and clearly distinguished to identify failed and/or broken processes. For example, detecting that some sequence patterns are present and/or missing for a certain process compared to a respective normal process may be indicative of a failure in the certain process.

It is expected that during the life of a patent maturing from this application many relevant systems, methods and computer programs will be developed and the scope of the term string metric is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of detecting at least one anomaly within a plurality of non-training log messages during run-time, by using a clustering model targeting a predefined source of the run-time messages, comprising:
using at least one processor for:
calculating a string distance between a textual content of each of a plurality of non-training log messages, in run-time, and a representative string pattern of each of a plurality of clusters of a clustering model targeting a predetermined certain source of messages, wherein said clustering model is constructed during a training phase, using a plurality of training messages which are selected, constructed and adapted to represent non-training messages originated by said predetermined certain source which is targeted for log message analysis during a run-time phase;
detecting at least one log message of the plurality of non-training log messages for which the string distance to the representative string pattern of each of the plurality of clusters exceeds a predefined threshold; and
generating an alert indicative of the at least one detected log message as at least one suspected anomaly.

2. The computer implemented method of claim 1, further comprising:
analyzing the detected log message to detect at least one of an anomaly type and at least one characteristic of the detected message.

3. The computer implemented method of claim 2, wherein said analyzing is a statistical analysis.

4. The computer implemented method of claim 1, wherein said at least one suspected anomaly is a member of a group consisting of: an anomaly in a computer platform, an anomaly in at least one infrastructure, an anomaly in at least one service, an anomaly in at least one application and an anomaly in a process to which said plurality of non-training messages relate.

5. The computer implemented method of claim 1, wherein said clustering model is adapted to perform clustering in run-time, of said plurality of non-training log messages in a plurality of clusters.

6. The computer implemented method of claim 5, wherein said clustering model is constructed by:
receiving, during said training phase, the plurality of training log messages;
performing the following for each of the plurality of training log messages, during said training phase:
calculating a string distance between a textual content of the respective training log message and a representative string pattern of each of the plurality of clusters,
associating the respective training log message with a respective one of the plurality of clusters in case the string distance is within a predefined threshold, and
adding a new cluster to the plurality of clusters for associating respective training log message in case the string distance exceeds the predefined threshold; and
outputting the clustering model.

7. The computer implemented method of claim 1, wherein the string distance is expressed by at least one string metric.

8. The computer implemented method of claim 7, wherein the at least one string metric is Levenshtein distance.

9. The computer implemented method of claim 6, wherein the representative string pattern of at least one of the plurality of clusters is created by extracting a common string pattern shared by all training log messages associated with the at least one cluster, the common string pattern comprising at least one constant token and at least one variable field adapted to receive a plurality of values included in the log messages of a respective cluster.

10. The computer implemented method of claim 1, wherein said predetermined certain source is a member of a group consisting of: a computing platform, an infrastructure, a service, an application and a process.

11. The computer implemented method of claim 1 further comprising:
detecting at least one sequence pattern of log messages in the plurality of non-training log messages by:
identifying respective clusters selected, using said clustering model, for each of at least one subset of the plurality of non-training log messages received in sequence, and
detecting the at least one sequence pattern according to the selection of the respective clusters.

12. A system for detecting at least one anomaly within a plurality of non-training log messages during run-time, by using a clustering model targeting a predefined source of the run-time messages, comprising:
a program store storing a code; and
at least one processor coupled to the program store for executing the stored code, the code comprising:
code instructions for calculating a string distance between a textual content of each of a plurality of non-training log messages, in run-time, and a representative string pattern of each of a plurality of clusters of a clustering model targeting a predetermined certain source of messages, wherein said clustering model is constructed during a training phase, using a plurality of training messages which are selected, constructed and adapted to represent non-training messages originated by said predetermined certain source which is targeted for log message analysis during a run-time phase;
code instructions for detecting at least one log message of the plurality of non-training log messages for which the string distance to the representative string pattern of each of the plurality of clusters exceeds a predefined threshold; and
code instructions for generating an alert indicative of the at least one detected log message as at least one suspected anomaly.

13. The system of claim 12, wherein said code further comprising:
    code instructions for analyzing the detected log message to detect at least one of an anomaly type and at least one characteristic of the detected message.

14. The system of claim 13, wherein said analyzing is a statistical analysis.

15. The system of claim 12, wherein said at least one suspected anomaly is a member of a group consisting of: an anomaly in a computer platform, an anomaly in at least one infrastructure, an anomaly in at least one service, an anomaly in at least one application and an anomaly in a process to which said plurality of non-training messages relate.

16. A computer program product comprising a non-transitory computer readable storage medium storing program code thereon for execution by at least one hardware processor, said program code comprising:
    program instructions for calculating a string distance between a textual content of each of a plurality of non-training log messages, in run-time, and a representative string pattern of each of a plurality of clusters of a clustering model targeting a predetermined certain source of messages, wherein said clustering model is constructed during a training phase, using a plurality of training messages which are selected, constructed and adapted to represent non-training messages originated by said predetermined certain source which is targeted for log message analysis during a run-time phase;
    program instructions for detecting at least one log message of the plurality of non-training log messages for which the string distance to the representative string pattern of each of the plurality of clusters exceeds a predefined threshold; and
    program instructions for generating an alert indicative of the at least one detected log message as at least one suspected anomaly.

17. The computer program product of claim 16, wherein said program code further comprising:
    program instructions for analyzing the detected log message to detect at least one of an anomaly type and at least one characteristic of the detected message.

18. The computer program product of claim 17, wherein said analyzing is a statistical analysis.

19. The computer program product of claim 16, wherein said at least one suspected anomaly is a member of a group consisting of: an anomaly in a computer platform, an anomaly in at least one infrastructure, an anomaly in at least one service, an anomaly in at least one application and an anomaly in a process to which said plurality of non-training messages relate.

* * * * *